Figures 1, 2:
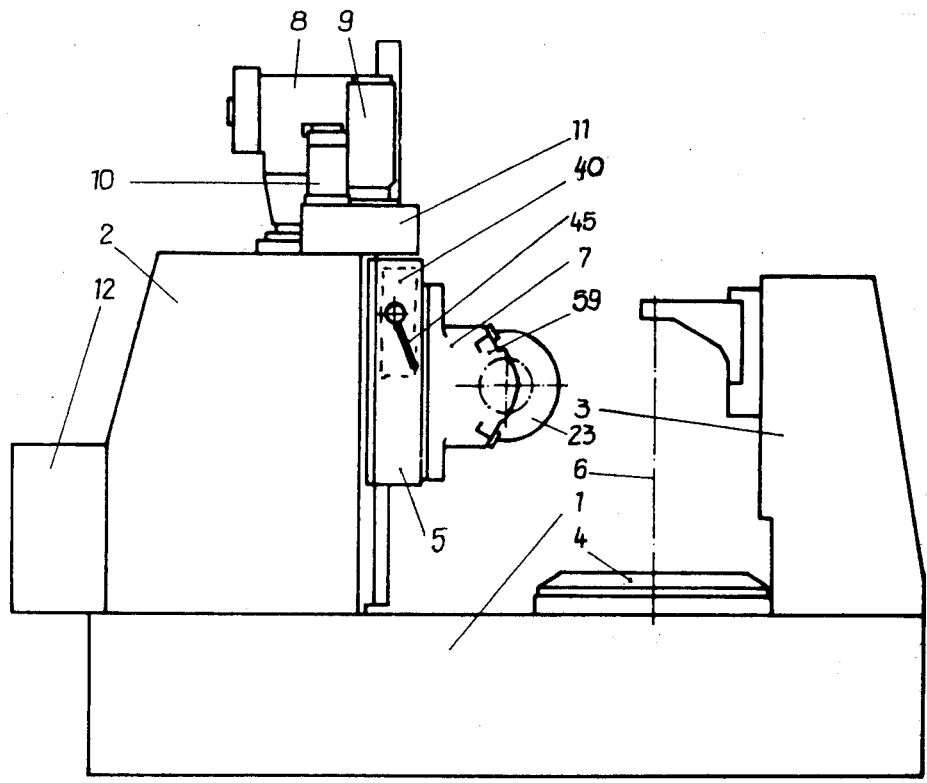

United States Patent [19]

Papistok et al.

[11] 4,284,376
[45] Aug. 18, 1981

[54] SPUR GEAR HOBBING MACHINE

[75] Inventors: Heinz Papistok, Karl-Marx-Stadt; Herbert Reuter, Weissbach; Lothar Bachmann, Karl-Marx-Stadt, all of German Democratic Rep.

[73] Assignee: Veb Werkzeugmaschinenkombinat "7. Oktober" Berlin, Berlin, German Democratic Rep.

[21] Appl. No.: 20,332

[22] Filed: Mar. 14, 1979

[30] Foreign Application Priority Data

Mar. 10, 1978 [DD] German Democratic Rep. ... 204090

[51] Int. Cl.³ .............................................. B23F 5/22
[52] U.S. Cl. ......................................... 409/24; 409/1; 409/19
[58] Field of Search ............... 409/20, 22, 24, 19, 409/10, 11, 23, 17, 18

[56] References Cited

U.S. PATENT DOCUMENTS

| 2,075,489 | 3/1937 | Warner et al. | 409/20 |
| 2,330,168 | 9/1943 | Zimmermann | 409/11 |
| 2,839,968 | 6/1958 | Moncrieff | 409/19 X |
| 3,107,579 | 10/1963 | Budnick et al. | 409/24 X |
| 3,207,038 | 9/1965 | Naville | 409/19 |
| 3,318,193 | 5/1967 | Rogg | 409/11 |
| 3,453,931 | 7/1969 | Campbell | 409/19 |
| 3,738,225 | 6/1973 | Tixier | 409/24 X |

FOREIGN PATENT DOCUMENTS

| 97575 | 5/1973 | German Democratic Rep. | 409/24 |
| 2332838 | 1/1974 | German Democratic Rep. | 409/10 |

Primary Examiner—William R. Briggs
Attorney, Agent, or Firm—Michael J. Striker

[57] ABSTRACT

A hobbing machine for manufacturing spur and worm gears comprises a tool support provided with a support carriage movable in the direction of the axis of the blank to be machined and carrying a milling head provided with a separate feed drive which actuates via a branch gearing axial and tangential feed gear element and is connected via differential gears to a gear train for a hob. The branch gearing is arranged in the movable support carriage and includes a switch wheel which is engageable either with a drive wheel of the axial feed gear train or with the drive wheel of the tangential feed gear train and is controlled by a switching lever located on the support carriage.

2 Claims, 2 Drawing Figures

SPUR GEAR HOBBING MACHINE

THE FIELD OF APPLICATION OF THE INVENTION

The field of application of the invention relates to spur gear hobbing machines for the production of spur and worm gears in which a support carriage is arranged on a tool support for sliding in the direction of the axis of a blank to be machined and carries a milling head provided with a separate feed drive which actuates via ramification gearing axial or tangential feed gear elements and is connected via differential gears to a gear train for a hob.

CHARACTERISTICS OF KNOWN TECHNICAL SOLUTIONS

A spur gear hobbing machine for manufacturing spur and worm gears, having a separate feed drive which actuates via a branch gearing the axial or tangential feed gear elements and is connected via a differential gearing to the gear train for the hob, is already known. In this spur gear hobbing machine according to DD-WP No. 97 575 the branch gearing for driving the axial- and tangential feed gear elements is arranged on the side of the tool support opposite the support carriage. The branch gearing consists of changeover gears which so interchange that the feed drive can actuate the axial- or also the tangential feed gear elements. The gear elements of the axial and tangential feed gears which are arranged in the tool support and in the support carriage, are connected via two separate gear trains which pass through the tool support, to the changeover gears forming the branch gearing. Via these two gear trains, there is also established by way of the differential gears the necessary connection to the train of gears for the hob.

This solution in which the branch gears for driving the axial and tangential feed gear elements are arranged on the side of the tool support opposite the support carriage, has still essential disadvantages.

Due to the arrangement of the mentioned branch gearings, there is still necessary a considerable expenditure of gear elements, especially for the passage of both gear trains through the tool support. Thereby the rigidity of the gear trains is negatively influenced which leads to an increased development of noises and negatively affects the attainable accuracy of the produced gear. In order to eliminate more thoroughly these negative phenomena, structural and technological measures are necessary which again are connected with an increased expenditure of manufacturing time and of material.

OBJECT OF THE INVENTION

The object of the invention is to reduce mechanical expenditures for the axial and tangential feed gears and thereby to increase the accuracy of the produced gear.

Disclosure of the Essence of the Invention

The Technical Problem Which is Solved by the Invention

The problem forming the basis of this invention is to provide a spur gear hobbing machine for manufacturing spur and worm gears, in which a support carriage is arranged on a tool support for sliding in a direction of the axis of a blank to be machined and carries a milling head provided with a separate feed drive which actuates via a branch gearing axial or tangential feed gear elements and is connected via differential gears to a gear train for a hob and in which the branch gearing inside the machine is so arranged that a small number of gear elements results for the axial and tangential feed gears.

CHARACTERISTIC FEATURES OF THE INVENTION

According to this invention the problem is solved in such a manner that the branch gearing for driving the axial and tangential feed gear elements are arranged in the support carriage.

According to a further feature of the invention the branch gearing consists of a switch wheel which can be brought into engagement either with a drive gear of the axial or the tangential feed gear train and is controlled by the switching lever located on the support carriage.

By the arrangement of the branch gears in the support carriage which performs the axial feeding movement, very short gear trains having a very small amount of gear elements for the axial and tangential feed gears are attained and thereby the rigidity of the gear trains, the reduction of noises and the increase of the accuracy are improved.

EXEMPLARY EMBODIMENT

In the following the invention is explained in more detail in an example of an embodiment.

In the accompanying drawings

FIG. 1: shows a front view of the spur gear hobbing machine

FIG. 2: shows the schematic diagram of the gearing arrangement, especially for the axial and tangential feed gears.

According to FIG. 1 a tool support 2 and a counter support 3 are arranged on a machine bed 1. The machine bed 1 supports for rotation a blank holder or support 4. A support carriage 5 supporting a milling head 7 is arranged on the tool support 2 for sliding movement in the direction of axis of rotation 6 of the blank support 4. On the tool support 2, there are arranged on a housing 11 fixed to the support 2, a main driving motor 8, a feed motor 9 and a quick return motor 10. A gear box 12 is further fixed to the tool support 2.

From FIG. 2 it can be seen that a gear train for the hob is driven via a shaft 13 by the main drive motor 8. The drive of the hob 23 which is mounted on the milling spindle 22 takes place at one side of the shaft 13 via a bevel gear 14 which is shiftable on the shaft 13, a bevel gear 15 on a shaft 16 and a bevel gear 17, a bevel gear 19 shiftable on a shaft 18, a spur gear 20 and a spur gear 21 that is arranged on the milling spindle 22. The drive of the blank support 4 takes place via a bevel gear 24 arranged on the shaft 13 and on the other side via a bevel gear 25, a differential gear drive 26, index change gears 27, a shaft 28 with an indexing worm 29 and an index worm wheel 30.

The feed motor 9 drives via an electromagnetic coupling 31 a vertical shaft 32. On the vertical shaft 32 is arranged a shiftable bevel gear 33 and a fixed bevel gear 34. The connection to the gear train for the hob is established from the bevel gear 34 via a bevel gear 35 on a shaft 36, differential change gears 37 via the differential gears 26. The differential gears 26, the differential change gears 37 and the index change gears 27 are placed in the gear box 12 arranged on the tool support 2.

The powering of a branch gearing 40 for driving the axial and tangential feed gear elements takes place from the bevel gear 33 via a bevel gear 38 which is arranged on a shaft 39. The branch gearing 40 consists of a switch gear 41 which is shiftably arranged on a shaft 39 and of a drive gear 42 for the axial feed gear elements and a drive gear 43 for the tangential feed gear elements. The drive gear 42 is loosely rotatable on a shaft 44 so as to rotate independently from the latter and the drive gear 43 is fixedly supported.

The switching gear 41 can be brought into engagement either with the drive gear 42 or with a drive gear 43. This takes place by means of a switching lever 45 which is arranged on the support carriage 5 (see FIG. 1).

The drive for the axial feed gear elements runs from the branch gearing 40 in which the switching gear 41 engages the driving gear 42 on the shaft 44, via a spur gear 46, a worm 48 arranged on a shaft 47 up to a worm gear 49 located on a threaded spindle 50, the latter engaging a spindle nut 51 so arranged in the support carriage 5 that the latter can move in the direction of the rotary axis 6 of the blank support 4.

The drive for the tangential feed gear elements runs from the branch gearing 40 in which the switching gear 41 meshes with the driving gear 43 arranged on the shaft 44 and the shaft 44, via a spur gear 52 at the end of the shaft 44, a spur gear 53, another spur gear 54 which is fixedly arranged on one side of the shaft 55, a worm 56 which is located on the other end of the shaft 55, up to a worm wheel 57 which is provided with a spindle nut 58 engaging an adjustment spindle 60 connected to a tangential carriage 59 so that the latter which carries the hob 23 and is supported by the milling head 7 is shiftable in tangential direction to the diameter of the blank.

The aforementioned axial and tangential feed gear trains can also be driven by the quick return motor 10. This happens via a spur gear 61, an intermediate gear 62 and a spur gear 63 which is supported for loose rotation on the vertical shaft 32 so as to rotate independently from the latter. If the quick return motor 10 is supposed to operate as a drive, the electromagnetic coupling 31 is connected to the spur gear 63 and the connection of the electromagnetic coupling 31 between the feed motor 9 and the vertical shaft 32 is released. The spur gear 61 and 63, the intermediate gear 62 and the electromagnetic coupling 31 are supported on the housing 11 (see FIG. 1).

What is claimed is:

1. A hobbing machine for manufacturing gears, comprising a tool support; a blank support arranged for rotation about an axis so as to rotate a blank to be machined; a support carriage arranged for movement on the tool support in the direction of the axis of the blank support; a milling head arranged for movement on the support carriage and having means to rotatably support a hob; a drive for rotating the hob; a gear train for the hob and connected with the hob drive; a separate feed drive for the milling head; an axial feed gear train and a tangential feed gear train for the milling head for feeding the milling head in axial and tangential direction relative to the blank support axis; a branch gearing cooperating with the separate milling head drive and operable selectively to actuate the axial and tangential feed gear trains, said branch gearing being supported and arranged solely in the support carriage; and differential gears connected with the hob drive and the separate milling head feed drive.

2. The hobbing machine as defined in claim 1, wherein the branch gearing includes a switch wheel connected with the milling head feed drive, a first drive wheel connected with the axial feed gear train and operatively connectable with the switch wheel, a second drive gear connected with the tangential feed gear train and operatively connectable with the switch wheel, and a switching lever cooperating with the switch wheel so as to selectively engage the latter with one of the drive wheels, said switch wheel and said drive wheels being arranged in said switching lever being arranged on the support carriage.

* * * * *